(12) United States Patent
Morita et al.

(10) Patent No.: US 9,018,922 B2
(45) Date of Patent: Apr. 28, 2015

(54) CAPACITOR DEVICE

(71) Applicant: Panasonic Intellectual Property Management Co., Ltd., Osaka (JP)

(72) Inventors: Kazuki Morita, Osaka (JP); Hideaki Hamai, Kyoto (JP); Yoshimitu Odajima, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 332 days.

(21) Appl. No.: 13/685,762

(22) Filed: Nov. 27, 2012

(65) Prior Publication Data

US 2013/0154579 A1   Jun. 20, 2013

(30) Foreign Application Priority Data

Dec. 15, 2011  (JP) ................................. 2011-274170

(51) Int. Cl.
*H02J 7/00* (2006.01)

(52) U.S. Cl.
CPC ................. *H02J 7/00* (2013.01); *H02J 7/0026* (2013.01); *H02J 7/0077* (2013.01); *H02J 7/0091* (2013.01); *Y02T 10/7055* (2013.01)

(58) Field of Classification Search
CPC ....................................................... H02J 7/345
USPC ................................................. 320/166, 167
See application file for complete search history.

(56) References Cited

U.S. PATENT DOCUMENTS

| | | | | |
|---|---|---|---|---|
| 5,783,928 A | * | 7/1998 | Okamura | ....................... 320/122 |
| 2009/0009145 A1 | * | 1/2009 | Odajima et al. | .............. 320/166 |

FOREIGN PATENT DOCUMENTS

| | | |
|---|---|---|
| JP | 03-253224 | 11/1991 |
| JP | 06-261452 | 9/1994 |
| JP | 2002-142373 | 5/2002 |
| JP | 2006-340505 | 12/2006 |

* cited by examiner

*Primary Examiner* — Edward Tso
*Assistant Examiner* — Ahmed Omar
(74) *Attorney, Agent, or Firm* — Wenderoth, Lind & Ponack, L.L.P.

(57) ABSTRACT

A capacitor device includes a capacitor unit, a voltage-dividing circuit for outputting a divided voltage obtained by dividing a voltage of the capacitor unit, and a comparator circuit. The comparator circuit causes the charge circuit to operate such that the voltage of the capacitor unit reaches a full-charge voltage. The voltage-dividing circuit includes a semiconductor switching element, and outputs a divided voltage. A control circuit is operable to determine the full-charge voltage to be a high-temperature full-charge voltage by turning off the first semiconductor switching element when a temperature at the capacitor unit exceeds a reference temperature. The control circuit is operable to determine the full-charge voltage to be a low-temperature full-charge voltage that is higher than the high-temperature full-charge voltage by turning on the first semiconductor switching element when the detected temperature is not higher than the reference temperature.

10 Claims, 5 Drawing Sheets

CAPACITOR DEVICE

FIELD

The present invention relates to a capacitor device that controls the charging of a capacitor unit.

BACKGROUND

Electric vehicles and hybrid vehicles have increasingly been marketed with consideration to the environment and to improve fuel efficiency. In these vehicles, when a starter, which consumes a large current intermittently during use, is driven, a battery voltage temporarily drops. An automotive capacitor device is employed as an auxiliary power supply for supplying sufficient power to a load during this temporal drop of the battery voltage or for supplying power to a vehicle control system at occurrence of battery abnormality.

Figure 7:
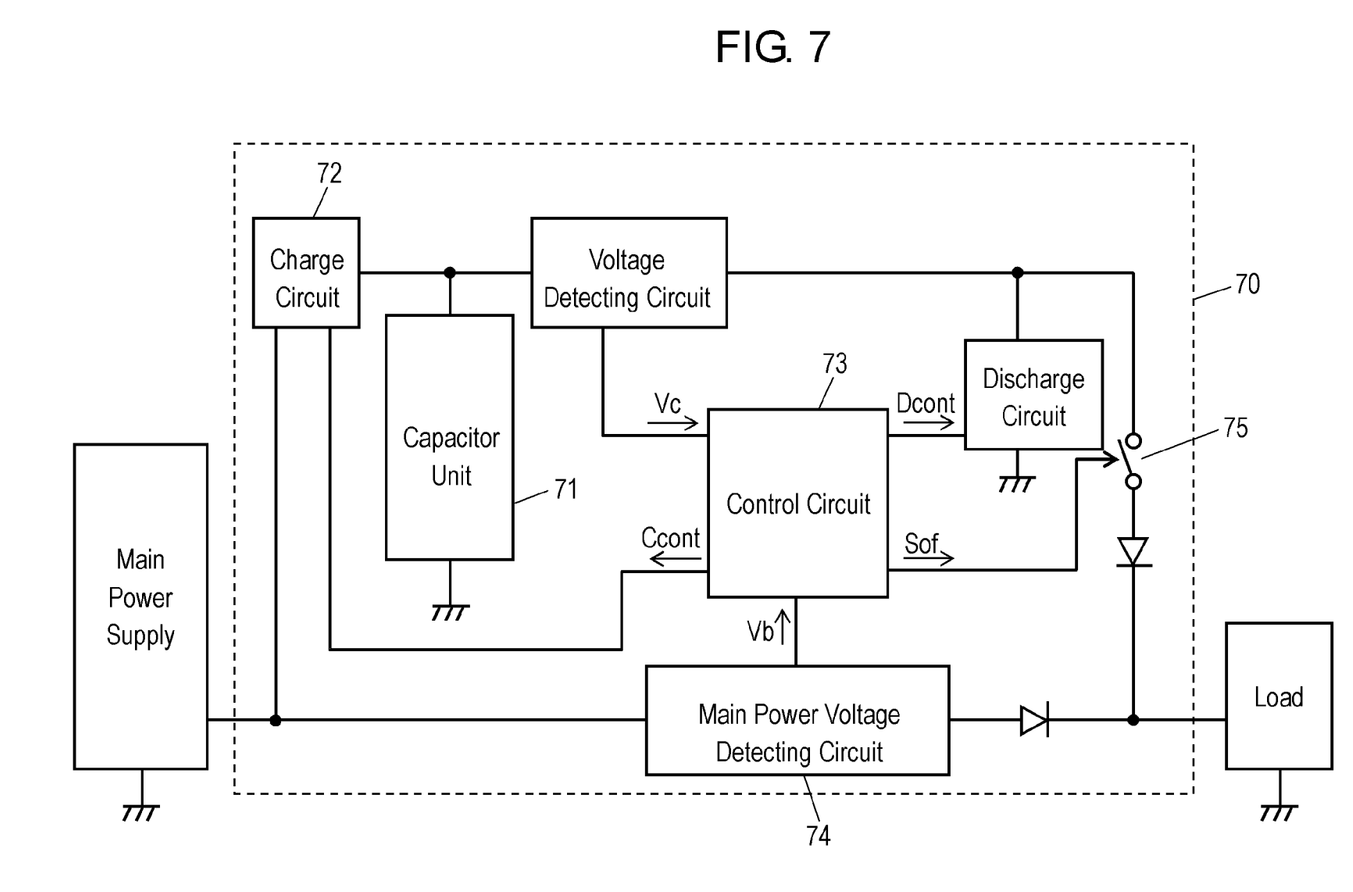
FIG. 7 is a block circuit diagram of a conventional capacitor device.

FIG. 7 is a circuit block diagram of conventional capacitor device 70. In capacitor device 70, plural capacitors storing battery power of the main power supply constitute capacitor unit 71. Charge circuit 72 for charging capacitor unit 71 is connected to capacitor unit 71. Control circuit 73 controls charge circuit 72.

Control circuit 73 charges capacitor unit 71 up to a full-charge voltage. When control circuit 73 detects a voltage drop of the main power supply based on a voltage signal from main power voltage detecting circuit 74, control circuit 73 turns on switch 75 to supply power of capacitor unit 71 to the load.

Japanese Patent Laid-Open Publication No. 2006-340505 discloses a conventional capacitor device similar to capacitor device 70.

In conventional capacitor device 70, at low temperatures, since a capacitance of a capacitor decreases and an internal resistance increases, the stored power decreases, thus degrading storage performance. On the other hand, at high temperatures, a storage performance of the capacitor improves at high temperatures, but the capacitor tends to deteriorate due to an overcharge applied to the capacitor.

SUMMARY

A capacitor device includes a capacitor unit, a charge circuit for charging the capacitor unit, a temperature detector for detecting a temperature of the capacitor unit or a temperature around the capacitor unit, a voltage-dividing circuit for outputting a divided voltage obtained by dividing a voltage of the capacitor unit, a reference voltage circuit for outputting a reference voltage that is a constant voltage, and a comparator circuit. The comparator circuit compares the divided voltage with the reference voltage so as to cause the charge circuit to operate such that the voltage of the capacitor unit reaches a full-charge voltage. The voltage-dividing circuit includes first and second resistors connected in series to each other at a node and a variable resistor unit connected in parallel to the first resistor. The first variable resistor unit includes a third resistor and a first semiconductor switching element connected in series to the third resistor. The voltage-dividing circuit outputs the divided voltage from the node. A control circuit is operable to determine the full-charge voltage to be a predetermined high-temperature full-charge voltage by turning off the first semiconductor switching element when the detected temperature exceeds a reference temperature. The control circuit is operable to determine the full-charge voltage to be a predetermined low-temperature full-charge voltage that is higher than the high-temperature full-charge voltage by turning on the first semiconductor switching element when the detected temperature is not higher than the reference temperature. The voltage-dividing circuit may be provided in the reference voltage circuit instead of connected to the capacitor unit.

This capacitor device can improve storage performance of the capacitor unit and suppress deterioration of the capacitor unit.

DETAIL DESCRIPTION OF PREFERRED EMBODIMENTS

Exemplary Embodiment 1

Figure 1:
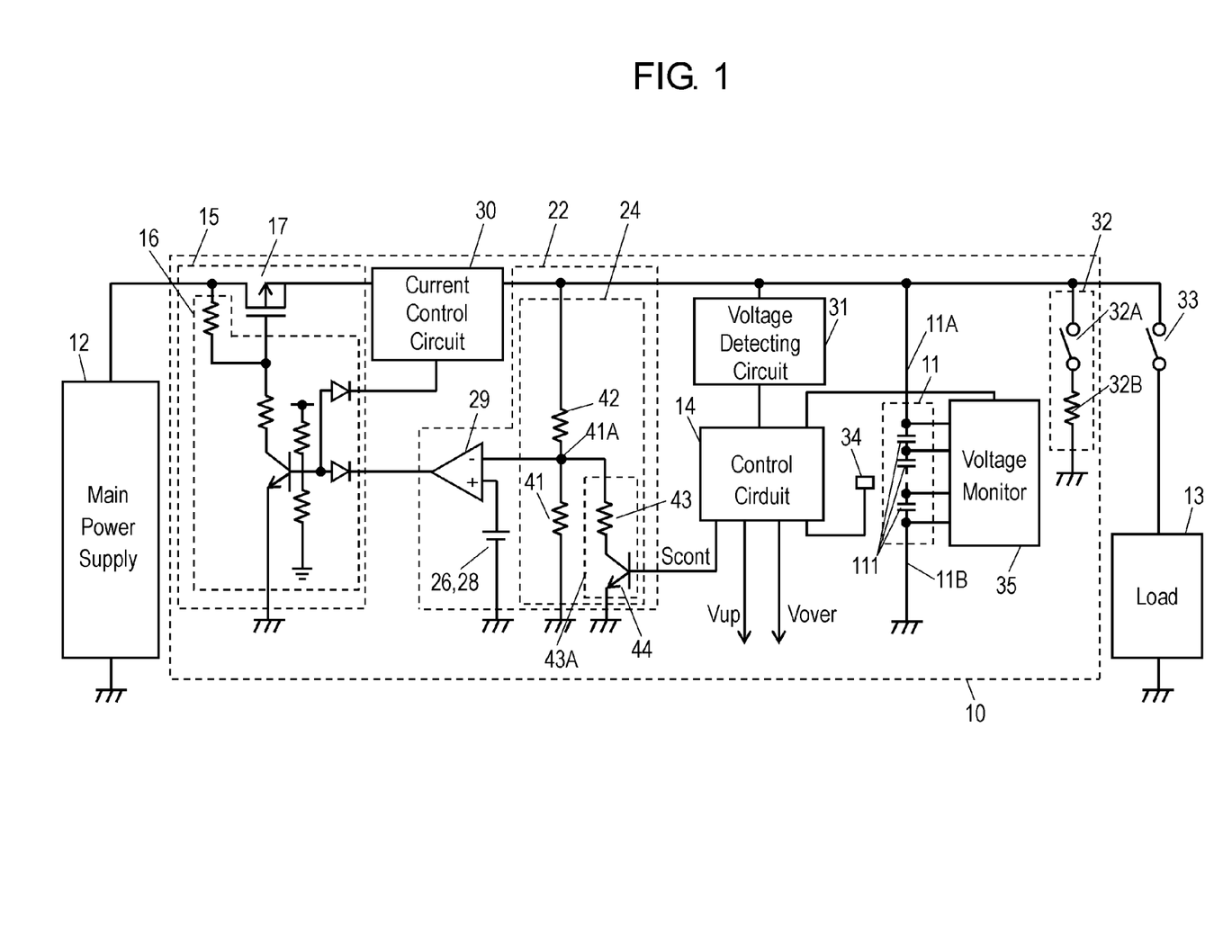
FIG. 1 is a block circuit diagram of a capacitor device in accordance with Exemplary Embodiment 1 of the present invention.

FIG. 1 is a block circuit diagram of a capacitor device in accordance with Exemplary Embodiment 1 of the present invention. Capacitor device 10 is an auxiliary power supply of main power supply 12, and is connected between main power supply 12 and load 13. Capacitor device 10 includes capacitor unit 11 for storing power of main power supply 12. The power stored in capacitor unit 11 is output to load 13 when control circuit 14 turns on power switch 33.

Capacitor unit 11 includes plural capacitors 111 connected in series to each other. Positive terminal 11A of capacitor unit 11 is connected to charge circuit 15, while negative terminal 11B is grounded.

Capacitor 111 may be an electric double layer capacitor, an electrolytic capacitor, or an electrochemical capacitor. In capacitor unit 11, the number of capacitors 111 and series or parallel connection thereof can be selected appropriately according to power required by load 13.

Charge circuit 15 is connected between main power supply 12 and capacitor unit 11 to charge capacitor unit 11, and includes semiconductor control element 17 and drive circuit 16. Drive circuit 16 controls an output of semiconductor control element 17. A semiconductor switching element, such as a field-effect transistor or a transistor, can be used as semiconductor control element 17.

Voltage control circuit 22 is connected to capacitor unit 11 and charge circuit 15 to control a charging voltage of capacitor unit 11, and includes voltage-dividing circuit 24, reference voltage circuit 26, and comparator circuit 29.

Voltage-dividing circuit 24 divides a voltage between terminals 11A and 11B of capacitor unit 11, and outputs the divided voltage, which proportional to the voltage. Voltage-dividing circuit 24 includes resistor 41 and resistor 42 connected in series to resistor 42 at node 41A. Resistor 41 is grounded, and resistor 42 is connected to terminal 11A at the positive terminal of capacitor unit 11. Voltage-dividing circuit 24 further includes variable resistor unit 43A including resistor 43 and semiconductor switching element 44 connected in series to resistor 43. Variable resistor unit 43A is connected in parallel to resistor 41. The divided voltage is output from node 41A at which resistors 41 and 42 are connected to each other. Resistors 41 to 43 are preferably fixed resistors, such as carbon-film resistors or metal-film resistors. Each of resistors 41 to 43 may be configured with plural fixed resistors. A field-effect transistor or a transistor may be typically used as semiconductor switching element 44, and is connected to control circuit 14. Semiconductor switching element 44 is controlled to turn on and off by switching signal Scont of control circuit 14.

Reference voltage circuit 26 includes constant-voltage power supply 28 for outputting a predetermined constant reference voltage. Constant-voltage power supply 28 can be configured with a shunt regulator or a regulator employing a Zener diode.

Comparator circuit 29 is an operational amplifier, and compares input divided voltage with the reference voltage to output a constant voltage control signal obtained from the comparison result to drive circuit 16 of charge circuit 15. Comparator circuit 29 outputs the constant voltage control signal when the divided voltage is not lower than the reference voltage, and does not output the constant voltage control signal when the divided voltage is lower than the reference voltage. The constant voltage control signal controls drive circuit 16 of charge circuit 15. If drive circuit 16 receives the constant voltage control signal, drive circuit 16 operates to limit an output of semiconductor control element 17 in order to maintain a predetermined constant voltage for the charging voltage of capacitor unit 11. If drive circuit 16 does not receive the constant voltage control signal, drive circuit 16 does not limit the output of semiconductor control element 17.

Current control circuit 30 is connected to capacitor unit 11 and charge circuit 15, and controls a charging current for charging capacitors 111 of capacitor unit 11. Current control circuit 30 outputs a constant current control signal when the charging current is not smaller than a predetermined current value, and does not output the constant current control signal when the charging current is smaller than the predetermined current value. The constant current control signal controls drive circuit 16 of charge circuit 15. If drive circuit 16 receives the constant current control signal, drive circuit 16 operates to limit the output of semiconductor control element 17 in order to charge capacitor unit 11 with the constant current. If drive circuit 16 does not receive the constant current control signal, drive circuit 16 does not limit the output of semiconductor control element 17.

If the divided voltage is lower than the reference voltage and also the charging current is smaller than the predetermined current value, comparator circuit 29 and current control circuit 30 do not output the constant voltage control signal or the constant current control signal. Drive circuit 16 thus charges capacitor unit 11 while both of constant voltage and constant current are not controlled.

Temperature detector 34 is connected to control circuit 14 to detect a temperature of capacitor unit 11 or a temperature around capacitor unit 11, and output, to control circuit 14, a temperature signal corresponding to the detected temperature. Temperature detector 34 can be implemented by a temperature sensor, such as a thermistor. The temperature sensor may contact capacitor unit 11 so as to detect the ambient temperature of capacitor unit 11. Alternatively, the temperature sensor may be mounted onto a printed circuit board close to capacitor unit 11.

Control circuit 14 is connected to temperature detector 34 and voltage control circuit 22 to output switching signal Scont for turning on and off semiconductor switching element 44 in accordance with the temperature signal. This controls a full-charge voltage that is the maximum voltage between terminals 11A and 11B of capacitor unit 11.

Control circuit 14 outputs switching signal Scont for turning on semiconductor switching element 44 in a low-temperature state that the temperature is lower than a reference temperature, and turning off semiconductor switching element 44 in a high-temperature state that the temperature exceeds the reference temperature.

The reference temperature can be determined according to characteristics of capacitor 111. For electric double-layer capacitor, the reference temperature is preferably not higher than 0° C. in order to suppress deterioration of capacitors 111 at high temperatures and to improve its storage performance at lower temperatures.

Discharge circuit 32 is connected between terminal 11A of capacitor unit 11 and the ground, terminal 11B. Discharge circuit 32 includes discharge switch 32A and discharge resistance 32B connected in series to discharge switch 32A. Capacitor unit 11 is forcibly discharged when control circuit 14 turns on discharge switch 32A.

In the low-temperature state, semiconductor switching element 44 is turned on, which is a short-circuiting state, thus causing variable resistor unit 43A to consist of resistor 43 and an internal resistance of semiconductor switching element 44 connected in series to resistor 43. This provides a parallel assembly of variable resistor unit 43A and resistor 41 connected in parallel to each other. A divided voltage obtained by dividing the voltage between terminals 11A and 11B of capacitor unit 11 with resistor 42 and the parallel assembly is output from node 41A.

On the other hand, in the high-temperature state, semiconductor switching element 44 is turned off, which is an insulated state. A divided voltage obtained by dividing the voltage between terminals 11A and 11B of capacitor unit 11 with resistors 41 and 42 is output from node 41A. The divided voltage while semiconductor switching element 44 is turned off in the high-temperature state is higher than that while semiconductor switching element 44 is turned on in the low-temperature state.

When the detected temperature exceeds the reference temperature, control circuit 14 controls voltage-dividing circuit 24 such that the divided voltage increases relatively to the reference voltage by turning off semiconductor switching element 44. As a result, the full-charge voltage of capacitor unit 11 is controlled to decrease at high temperatures.

In this way, capacitor device 10 improves reliability of capacitor unit 11 at high temperatures by decreasing the full-charge voltage at high temperatures and by increasing the full-charge voltage at low temperatures in capacitor device 10. Accordingly, storage energy of capacitor unit 11 at low temperatures can be secured.

Figure 2:
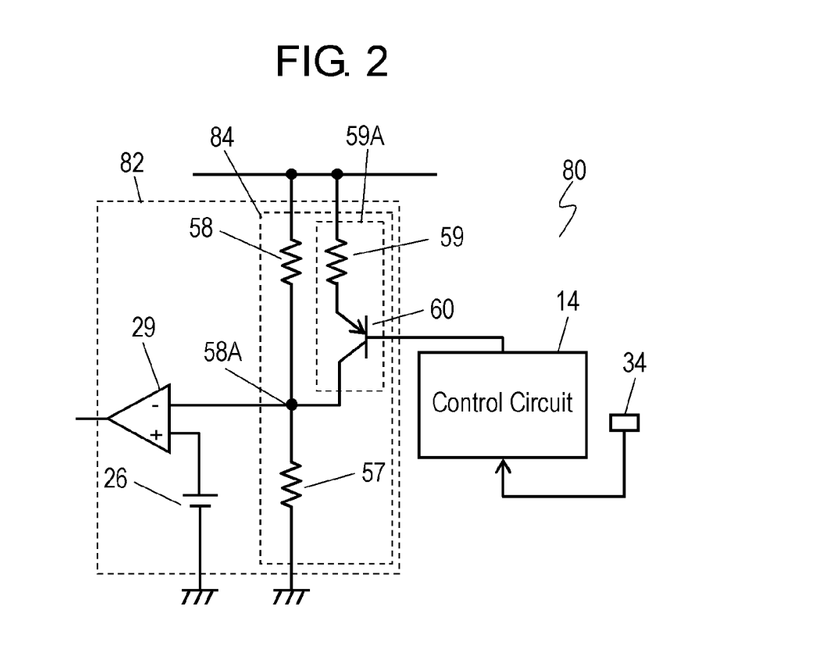
FIG. 2 is a block circuit diagram of a voltage control circuit of the capacitor device of a comparative example.

Next, the divided voltage will be detailed. FIG. 2 is a block circuit diagram of voltage control circuit 82 of capacitor device 80 of a comparative example. Capacitor device 80 of the comparative example includes voltage control circuit 82 with voltage-dividing circuit 84 instead of voltage control circuit 22 with voltage-dividing circuit 24 of capacitor device 10 according to Embodiment 1. In FIG. 2, components identical to those of capacitor device 10 shown in FIG. 1 are denoted by the same reference numerals.

Voltage-dividing circuit 84 of the comparative example includes resistors 57 and 58 connected in series to each other at node 58A. Resistor 57 is ground, and resistor 58 is connected to terminal 11A at the positive terminal of capacitor unit 11. Voltage-dividing circuit 84 further includes variable resistor unit 59A including resistor 59 and semiconductor switching element 60 connected in series to resistor 59. Variable resistor unit 59A is connected in parallel to resistor 58. The divided voltage is output from node 58A.

Voltage-dividing circuit 84 of capacitor device 80 of the comparative example is controlled to decrease the full-charge voltage of capacitor unit 11 when a temperature exceeds the reference temperature. Therefore, control circuit 14 turns on semiconductor switching element 60 when a temperature detected by temperature detector 34 exceeds the reference temperature, in order to control voltage-dividing circuit 84 to increase the divided voltage relatively to the reference voltage.

Variations of resistances of resistors 41, 42, 43, 57, 58, and 59 in voltage-dividing circuits 24 and 84 of capacitor devices 10 and 80 may typically range from 1% to 5% while variations of resistances of switching elements 44 and 60 which are turned on may typically range from 20% to 30%.

In capacitor device 10 according to Embodiment 1, an influence of the variations of resistances of semiconductor switching element 44 is eliminated by turning off semiconductor switching element 44 of voltage-dividing circuit 24 at high temperatures. This operation stabilizes the divided voltage. On the other hand, in capacitor device 80 of the comparative example, semiconductor switching element 60 of voltage-dividing circuit 84 is turned on at high temperatures. This increases variations of the divided voltage. As a result, the full-charge voltage at high temperatures can be stabilized by voltage-dividing circuit 24 of capacitor device 10 according to Embodiment 1. Variations of the full-charge voltage can thus be reduced. Deterioration of capacitor unit 11 caused by overvoltage due to fluctuation in the charging voltage can be reduced, hence improving reliability.

Capacitor device 10 according to Embodiment 1 has larger variations of the divided voltage than capacitor device 80 of the comparative example at low temperatures. However, an influence of the variations of the full-charge voltage on deterioration of capacitor unit 11 is smaller at low temperatures than at high temperatures. Accordingly, capacitor device 10 according to Embodiment 1 has larger variations of the full-charge voltage at low temperatures can influence deterioration of capacitor unit 11 with the full-charge voltage less than capacitor device 80 of the comparative example that has larger variations in the full-charge voltage at high temperatures.

As described above, capacitor device 10 according to Embodiment 1 decreases the variations of full-charge voltage at high temperatures than at low temperatures by turning on and off semiconductor switching element 44 of voltage-dividing circuit 24. This suppresses deterioration of capacitor 111 due to overcharge and also improves the storage performance by increasing the full-charge voltage of capacitor unit 11 at low temperatures.

Figure 3:
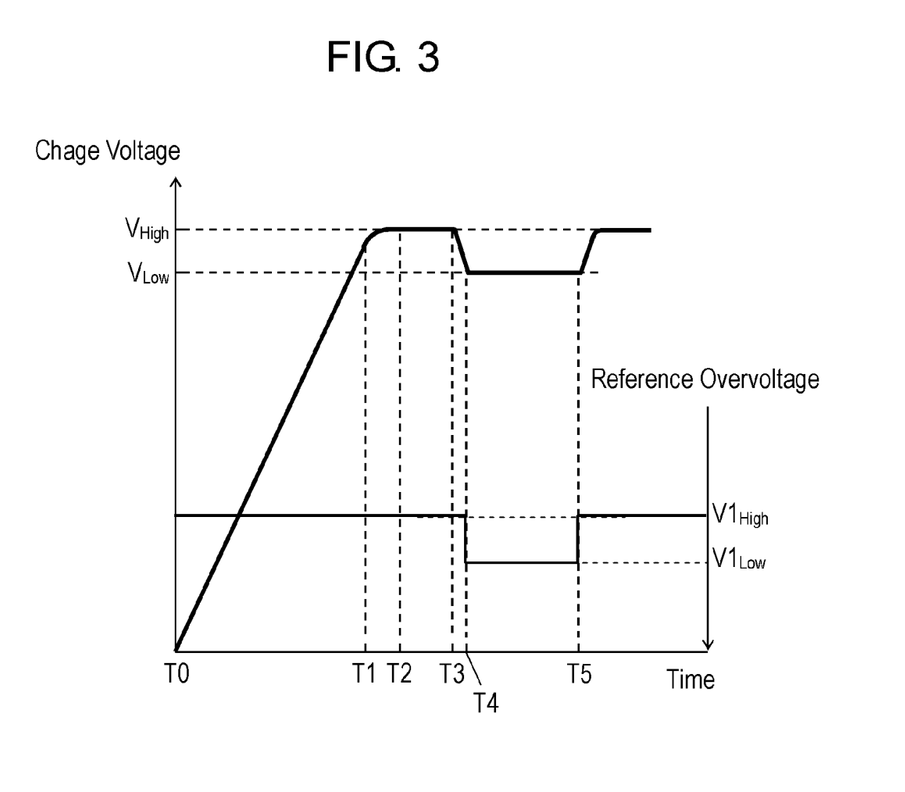
FIG. 3 illustrates a charging voltage of the capacitor device in accordance with Embodiment 1.

The charge and discharge control of capacitor unit 11 will be described below while capacitor device 10 is installed into a vehicle. FIG. 3 illustrates a charging voltage that is a voltage between terminals 11A and 11B of capacitor unit 11 of capacitor device 10. Main power supply 12 is a battery installed into the vehicle.

First, at time point T0, an ambient temperature at starting charging is low, such as when starting the use of a vehicle in a cold area. An ambient temperature of capacitor unit 11 detected by temperature detector 34 is lower than the reference temperature. Further, at time point T0, power is not stored in capacitor unit 11. Since the temperature detected by temperature detector 34 is lower than the reference temperature, control circuit 14 turns on semiconductor switching element 44 at time point T0. Since power is not stored in capacitor unit 11 at time point T0, charge circuit 15 charges capacitor unit 11 with constant current based on the constant current control signal from current control circuit 30. At this moment, the divided voltage is lower than the reference voltage, and thus voltage control circuit 22 does not output the constant voltage control signal. Furthermore, control circuit 14 outputs output-voltage command signal Vup for increasing the output voltage of a battery, main power supply 12, to an external electronic controller so that capacitor device 10 can store required power at low temperatures. Control circuit 14 outputs output-voltage command signal Vup at a low temperature that is the temperature detected by temperature detector 34 lower than the reference temperature.

Next, as the charging voltage between terminals 11A and 11B increases, the constant current control for charging capacitor unit 11 with constant current terminates at time point T1. However, the charging continues due to internal resistances of capacitor unit 11 and charge circuit and wiring resistances. When the charging voltage further increases and the divided voltage at node 41A becomes the same as the reference voltage at time point T2, the constant voltage control signal is output. Then, the constant voltage control is applied to capacitor unit 11 during a period from time points T2 to T3 such that that the voltage between terminals 11A and 11B of capacitor unit 11 becomes constant.

During the period from time points T2 to T3, the low-temperature state that the temperature detected by temperature detector 34 is lower than the reference temperature still continues. Accordingly, control circuit 14 continues to turn on semiconductor switching element 44, and the voltage between terminals 11A and 11B of capacitor unit 11 is maintained at a predetermined low-temperature full-charge voltage ($V_{High}$), which is to be controlled at low temperatures.

Then, in this full-charge state, when the ambient temperature of capacitor unit 11 reaches the reference temperature at time point T3 due to an increase of the temperature inside the vehicle, control circuit 14 turns off semiconductor switching element 44. Simultaneously to the turning off, control circuit 14 turns on the discharge switch of discharge circuit 22 and forcibly discharges capacitor unit 11. This operation decreases the voltage between terminals 11A and 11B of capacitor unit 11 to a predetermined high-temperature full-charge voltage ($V_{Low}$), which is to be maintained in the high-temperature state, in which the temperature is not less than the reference temperature, based on the charge voltage signal of voltage detecting circuit 31 (time point T4).

Discharge circuit 32 is connected between terminal 11A of capacitor unit 11 and a ground to discharge capacitor unit 11. Voltage detecting circuit 31 is connected to capacitor unit 11 and control circuit 14 to detect the charging voltage that is the voltage between terminals 11A and 11B of capacitor unit 11, and to output the charge voltage signal corresponding to the charging voltage to control circuit 14.

As described above, deterioration of capacitor unit 11 due to overcharging that exceeds the high-temperature full-charge voltage ($V_{Low}$) for a long period can be prevented by the forcible discharge down to the high-temperature full-charge voltage ($V_{low}$) when the temperature increases from a low temperature to over the reference temperature, thereby improving reliability of capacitor device 10.

Then, control circuit 14 maintains the voltage between terminals 11A and 11B of capacitor unit 11 at full-charge voltage ($V_{Low}$) while semiconductor switching element 44 is turned off (time points T4 to T5).

If the temperature detected by temperature detector 34 becomes a low temperature at time point T5 again, due to, e.g.

idle reduction, control circuit 14 turns on semiconductor switching element 44 and outputs output-voltage command signal Vup to the outside. Simultaneously to this, control circuit 14 charges capacitor unit 11 by the constant current control and the constant voltage control to maintain the voltage between terminals 11 and 11B of capacitor unit 11 at low-temperature full-charge voltage ($V_{High}$).

The detection of an abnormal overvoltage in plural capacitors 111 constituting capacitor unit 11 will be described below.

Voltage monitor 35 is connected to each of capacitors 111 and control circuit 14, and divides terminal voltages that are voltages between terminals of each of capacitors 111. The divided voltage is output to control circuit 14 as a terminal voltage signal of each of capacitors 111.

Control circuit 14 calculates a capacitor voltage of each of capacitors 111 based on the terminal voltage between both terminals of each of capacitors 111. Control circuit 14 outputs abnormal overvoltage signal Vover to the outside if an overvoltage abnormality in which the capacitor voltage of any one of capacitors 111 exceeds a predetermined reference overvoltage occurs. In this case, abnormal overvoltage signal Vover is not reset until a reset signal is input to control circuit 14.

Abnormal overvoltage signal Vover is output if the capacitor voltage of at least one of plural capacitors 111 reaches the predetermined reference overvoltage. The reference overvoltage is determined in accordance with the predetermined high-temperature full-charge voltage ($V_{Low}$) and the predetermined low-temperature full-charge voltage ($V_{High}$). In the low-temperature state that the temperature detected by temperature detector 34 is lower than the reference temperature, the reference overvoltage is determined to be the low-temperature reference overvoltage ($V1_{High}$). In the high-temperature state that the detected temperature is higher than the reference temperature, the reference overvoltage is determined to be the high-temperature reference overvoltage ($V1_{Low}$) that is lower than the low-temperature reference overvoltage ($V1_{High}$).

However, if the detected temperature exceeds the reference temperature from a low temperature that is lower than the reference temperature, the reference overvoltage is continued to be determined to be the low-temperature reference overvoltage ($V1_{High}$) until the voltage between terminals 11A and 11B of capacitor unit 11 decreases to the high-temperature full-charge voltage ($V_{Low}$). If the voltage between terminals 11A and 11B of capacitor unit 11 becomes the high-temperature full-charge voltage ($V_{Low}$), the reference overvoltage is determined to be the high-temperature reference overvoltage ($V1_{Low}$). The reference overvoltage determined as above, abnormal overvoltage signal Vover is not output at switching to the high-temperature full-charge voltage ($V_{Low}$) since the terminal voltages of all the capacitors 111 do not exceed the high-temperature reference overvoltage ($V1_{Low}$).

The determining of the reference overvoltage will be described with reference to FIG. 3 below. During a period from time point T0 to time point T3, the detected temperature is lower than the reference temperature. The reference overvoltage is thus determined to be the low-temperature reference overvoltage ($V1_{High}$). During a period from time point T3 to time point T4, the detected temperature exceeds the reference temperature, but the reference overvoltage is maintained to be the low-temperature reference overvoltage ($V1_{High}$). Then, at time point T4, the reference overvoltage is determined to be the high-temperature reference overvoltage ($V1_{Low}$). During a period from time point T4 to time point T5, the reference overvoltage is maintained to be the high-temperature reference overvoltage ($V1_{Low}$). When the detected temperature decreases to the reference temperature at time point T5, the reference overvoltage is determined to return to the low-temperature reference overvoltage ($V1_{High}$).

As described above, capacitor device 10 includes capacitor unit 11, charge circuit 15 connected to main power supply 12 for charging capacitor unit 11, temperature detector 34 for detecting the temperature of capacitor unit 11 or the temperature around capacitor unit 11, voltage-dividing circuit 24 for outputting the divided voltage obtained by dividing the voltage of capacitor unit 11, reference voltage circuit 26 for outputting the reference voltage that is a constant voltage, comparator circuit 29 for comparing the divided voltage with the reference voltage, and control circuit 14. Comparator circuit 29 compares the divided voltage with the reference voltage, and operates charge circuit 15 to cause the voltage of capacitor unit 11 to reach the full-charge voltage. Control circuit 14 is operable to determine the full-charge voltage. Voltage-dividing circuit 24 includes resistor 41 and resistor 42 connected in series to resistor 41 at node 41A, and variable resistor unit 43A connected in parallel to resistor 41. Variable resistor unit 43A includes resistor 43 and semiconductor switching element 44 connected in series to resistor 43. Voltage-dividing circuit 24 outputs the divided voltage from node 41A. Control circuit 14 is operable to turn off semiconductor switching element 44 when the detected temperature exceeds the reference temperature to determine the full-charge voltage to be the predetermined high-temperature full-charge voltage ($V_{Low}$). Control circuit 14 is operable to turn on semiconductor switching element 44 when the detected temperature is not higher than the reference temperature to determine the full-charge voltage to be the predetermined low-temperature full-charge voltage ($V_{High}$) that is higher than the high-temperature full-charge voltage ($V_{Low}$).

Discharge circuit 32 discharges capacitor unit 11. Control circuit 14 controls discharge circuit 32 to discharge capacitor unit so that the voltage of capacitor unit 11 becomes the predetermined high-temperature full-charge voltage ($V_{Low}$) when the detected temperature exceeds the reference temperature from a temperature lower than the reference temperature.

Voltage monitor 35 may be connected to capacitor unit 11. Capacitor unit 11 includes plural capacitors 111 connected to each other. Voltage monitor 35 detects voltages of capacitors 111. Control circuit 14 is operable to output the abnormal overvoltage signal if at least one of detected voltages of capacitors 111 exceeds the reference overvoltage. Still more, control circuit 14 is operable to determine the reference overvoltage to be the predetermined low-temperature reference overvoltage ($V1_{High}$) if the voltage of capacitor unit 11 is higher than the high-temperature full-charge voltage ($V_{Low}$) when the detected temperature exceeds the reference temperature from a temperature lower than the reference temperature. Furthermore, control circuit 14 is operable to determine the reference overvoltage to be the predetermined high-temperature reference voltage ($V1_{Low}$) that is lower than the predetermined low-temperature reference overvoltage ($V1_{High}$) if the voltage of the capacitor unit is not higher than the predetermined high-temperature full-charge voltage ($V_{Low}$) when the detected temperature exceeds the reference temperature from a temperature lower than the reference temperature.

Control circuit 14 may be operable to output the output-voltage command signal for increasing a voltage output from main power supply 12 when the detected temperature is lower than the reference temperature.

Exemplary Embodiment 2

Figure 4:
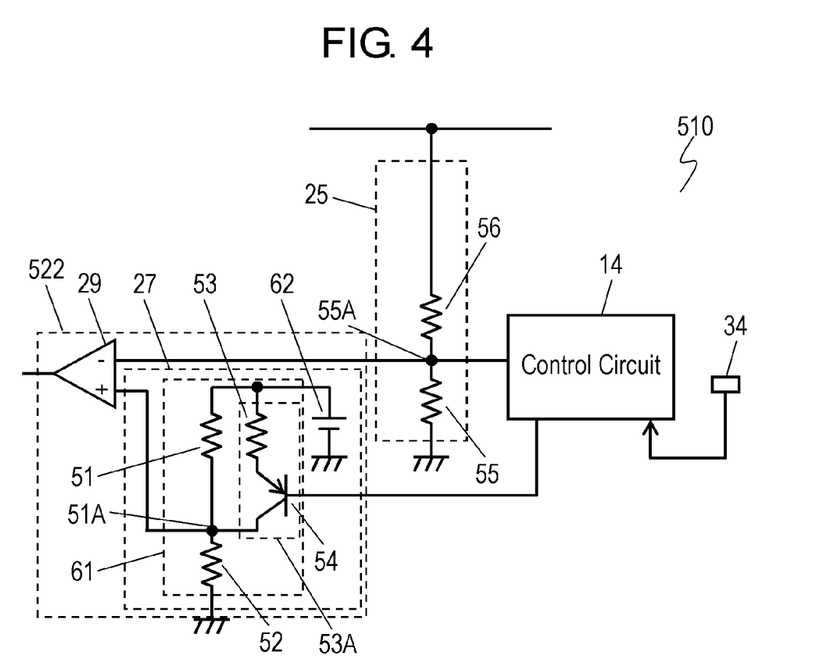
FIG. 4 is a block circuit diagram of a capacitor device in accordance with Exemplary Embodiment 2 of the invention.

FIG. 4 is a block circuit diagram of capacitor device 510 in accordance with Exemplary Embodiment 2 of the present invention. In FIG. 4, components identical to those of capacitor device 10 according to Embodiment 1 shown in FIG. 1 are denoted by the same reference numerals. Capacitor device 510 in accordance with Embodiment 2 includes voltage control circuit 522 instead of voltage control circuit 22 of capacitor device 10 according to Embodiment 1.

Voltage control circuit 522 is connected to capacitor unit 11 and charge circuit 15. Voltage control circuit 522 includes voltage-dividing circuit 25 for dividing voltage of capacitor unit 11 and outputting, to, reference voltage circuit 27, and comparator circuit 29, a divided voltage proportional to this voltage.

Voltage-dividing circuit 25 includes resistor 55 and resistor 56 connected in series to resistor 55 at node 55A. Resistor 55 is grounded, and resistor 56 is connected to terminal 11A at the positive terminal of capacitor unit 11. The divided voltage proportional to voltage between terminals 11A and 11B of capacitor unit 11 is output from node 55A. Resistors 55 and 56 are implemented by fixed resistors.

Voltage-dividing circuit 25 may function as a voltage detecting circuit for detecting the voltage of capacitor unit 11. In this case, the divided voltage is output to control circuit 14 as a charge voltage signal indicating the charging voltage between terminals 11A and 11B of capacitor unit 11.

Reference voltage circuit 27 includes constant-voltage power supply 62 for outputting a predetermined constant voltage and voltage-dividing circuit 61 for dividing the constant voltage output from constant-voltage power supply 62, and outputs a reference voltage.

Voltage-dividing circuit 61 includes resistors 51 and 52 connected in series to each other at node 51A and variable resistor unit 53A including resistor 53 and semiconductor switching element 54 connected in series to each other. Resistor 51 is connected to the positive terminal of constant-voltage power supply 62. Resistor 52 is ground. Variable resistor unit 53A is connected in parallel to resistor 51. The reference voltage is output from node 51A.

Control circuit 14 outputs switching signal Scont such that semiconductor switching element 54 is turned on in a low-temperature state that the temperature detected by temperature detector 34 is lower than the reference temperature, and that semiconductor switching element 54 is turned off in a high-temperature state that the detected temperature exceeds the reference temperature.

In the low-temperature state, semiconductor switching element 54 is turned on, which is a short-circuiting state. Variable resistor unit 53A thus includes resistance of resistor 53 and an internal resistance semiconductor switching element 54. In this case, variable resistor unit 53A and resistor 51 connected in parallel to each other constitute a parallel assembly. A reference voltage divided by this parallel assembly and resistor 52 is output from node 51A.

In the high-temperature state, semiconductor switching element 54 is turned off, which is an insulated state. A reference voltage divided by resistors 51 and 52 is output from node 51A. The reference voltage generated when semiconductor switching element 54 is turned off is lower than when semiconductor switching element 54 is turned on.

Control circuit 14 turns on semiconductor switching element 54 when the detected temperature is not higher than the reference temperature, and turns off semiconductor switching element 54 when the detected temperature exceeds the reference temperature. Control circuit 14 thus controls reference voltage circuit 27 to increase the divided voltage relatively to the reference voltage. As a result, voltage control circuit 522 is operable to decrease the full-charge voltage of capacitor unit 11 in the high-temperature state.

Accordingly, variations in the full-charge voltage in the high-temperature state can be reduced by tuning on and off semiconductor switching element 54 of voltage-dividing circuit 61 of reference voltage circuit 27. This operation suppresses deterioration of capacitor 111 due to overcharging and can also improve the storage performance by increasing the full-charge voltage of capacitor unit 11 in the low-temperature state.

As described above, capacitor device 510 includes reference voltage circuit 27. Reference voltage circuit 27 includes constant-voltage power supply 62 and voltage-dividing circuit 61 for outputting the reference voltage by dividing the voltage of constant-voltage power supply 62. Comparator circuit 29 is operable to cause charge circuit 15 to operate such that the voltage of capacitor unit 11 becomes the full-charge voltage by comparing the voltage proportional to the voltage of capacitor unit 11 with the reference voltage. Voltage-dividing circuit 61 includes resistors 51 and 52 connected in series to each other at node 51A and variable resistor unit 53A connected in parallel to resistor 51. Variable resistor unit 53A includes resistor 53 and semiconductor switching element 54 connected in series to each other. Voltage-dividing circuit 61 outputs the reference voltage from node 51A. Control circuit 14 turns off semiconductor switching element 54 when the detected temperature exceeds the reference temperature to determine the full-charge voltage to be the predetermined high-temperature full-charge voltage ($V_{Low}$). On the other hand, control circuit 14 is operable to turn on semiconductor switching element 54 when the detected temperature is not higher than the reference temperature to determine the full-charge voltage to be the predetermined low-temperature full-charge voltage ($V_{High}$) that is higher than the predetermined high-temperature full-charge voltage ($V_{Low}$).

Exemplary Embodiment 3

Figure 5:
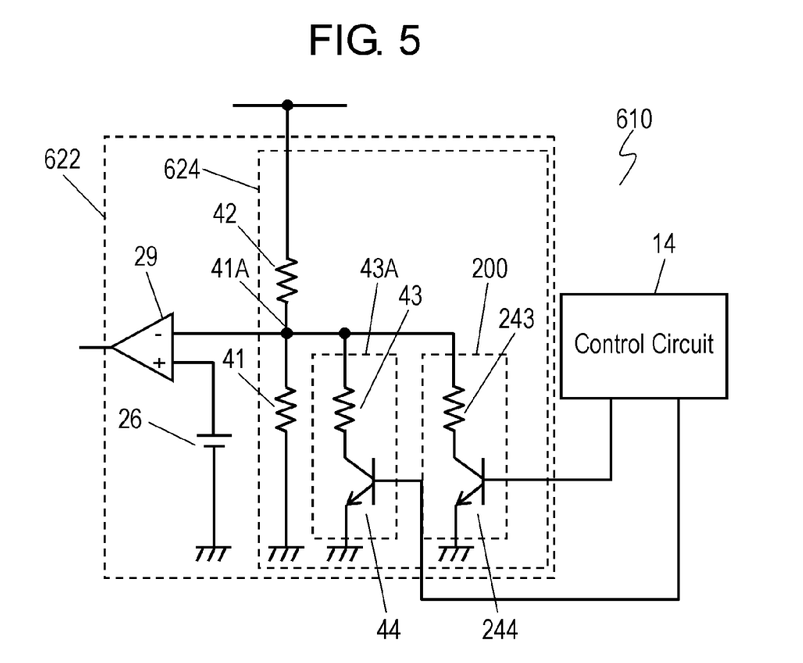
FIG. 5 is a block circuit diagram of a capacitor device in accordance with Exemplary Embodiment 3 of the invention.

FIG. 5 is a block circuit diagram of capacitor device 610 in accordance with Exemplary Embodiment 3. In FIG. 5, components identical to those of capacitor device 10 in accordance with Embodiment 1 shown in FIG. 1 are denoted by the same reference numerals. Capacitor device 610 in accordance with Embodiment 3 includes voltage control circuit 622 including voltage-dividing circuit 624 instead of voltage control circuit 22 including voltage-dividing circuit 25 of capacitor device 10 in accordance with Embodiment 1.

Voltage-dividing circuit 624 includes plural variable resistor units 43A and 200. Variable resistor units 43A and 200 are connected in parallel to resistor 41.

Variable resistor unit 43A includes resistor 43 and semiconductor switching element 44 connected in series to each other. Variable resistor unit 200 includes resistor 243 and semiconductor switching element 244 connected in series to each other. Semiconductor switching elements 44 and 244 are connected to control circuit 14.

Voltage control circuit 622 can determine two reference temperatures $Tr_{High}$ and $Tr_{Low}$ that are different from each other and correspond to semiconductor switching elements 44 and 244, respectively. Reference temperature $Tr_{Low}$ is lower than reference temperature $Tr_{High}$. Control circuit 14 turns on both semiconductor switching elements 44 and 244 when the temperature detected by temperature detector 34 is lower than reference temperature $Tr_{Low}$. As the detected temperature increases from a temperature not higher than reference temperature $Tr_{Low}$ and exceeds reference temperature $Tr_{Low}$ but not higher than reference temperature $Tr_{High}$, control circuit 14 turns off semiconductor switching element 44 while turning on semiconductor switching element 244. This operation causes control circuit 14 to decrease the full-charge voltage below the low-temperature full-charge voltage ($V_{High}$). Then, when the detected temperature further increases and exceeds reference temperature $Tr_{High}$, control circuit 14 turns off both semiconductor switching elements 44 and 244. This operation causes control circuit 14 to further decreases the full-charge voltage. Thus, control circuit 14 decreases the full-charge voltage step-by-step by turning off semiconductor switching elements 44 and 244 of variable resistor units 43A and 200 sequentially in accordance with the increase of the temperature detected by temperature detector 34.

As described above, voltage-dividing circuit 624 further includes variable resistor unit 200 connected in series to resistor 41. Variable resistor unit 200 includes resistor 243 and semiconductor switching element 244 connected in series to each other. Control circuit 14 is operable to decrease the full-charge voltage step-by-step from the predetermined low-temperature full-charge voltage ($V_{High}$) by sequentially turning off semiconductor switching elements 44 and 244 in accordance with the increase of the detected temperature.

Exemplary Embodiment 4

Figure 6:
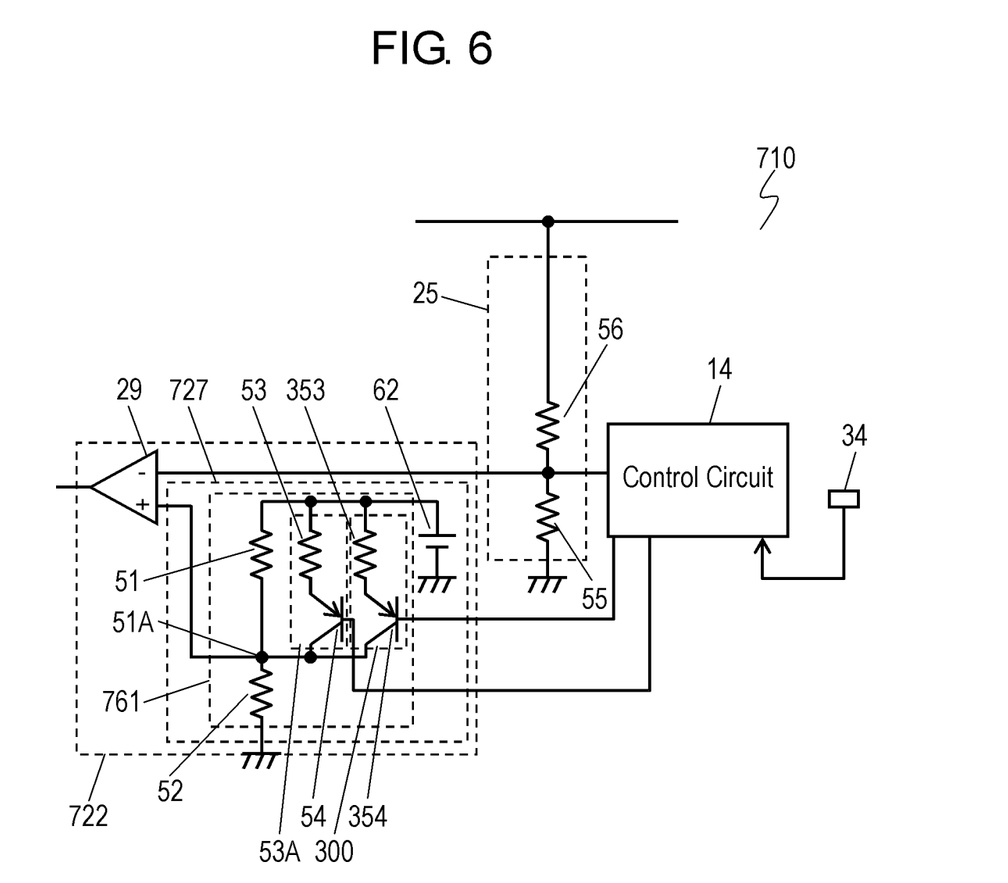
FIG. 6 is block circuit diagram of a capacitor device in accordance with Exemplary Embodiment 4 of the invention.

FIG. 6 is a block circuit diagram of capacitor device 710 in accordance with Exemplary Embodiment 4 of the present invention. In FIG. 6, components identical to those of capacitor device 510 in accordance with Embodiment 2 shown in FIG. 4 are denoted by the same reference numerals. Capacitor device 710 in accordance with Embodiment 4 includes reference voltage circuit 727 including voltage-dividing circuit 761 instead of reference voltage circuit 27 including voltage-dividing circuit 61 of capacitor device 510 in accordance with Embodiment 2 shown in FIG. 4.

Voltage-dividing circuit 761 includes plural variable resistor units 53A and 300. Plural variable resistor units 53A and 300 are connected in parallel to resistor 51.

Variable resistor unit 53A includes resistor 53 and semiconductor switching element 54 connected in series to each other. Variable resistor unit 300 includes resistor 353 and semiconductor switching element 354 connected in series to each other. Semiconductor switching elements 54 and 354 are connected to control circuit 14.

Voltage control circuit 722 can determine two reference temperatures $Tr_{High}$ and $Tr_{Low}$ that are different from each other and correspond to semiconductor switching elements 54 and 354, respectively. Reference temperature $Tr_{Low}$ is lower than reference temperature $Tr_{High}$. Control circuit 14 is operable to turn on both semiconductor switching elements 54 and 354 when the temperature detected by temperature detector 34 is lower than reference temperature $Tr_{Low}$. If the detected temperature increases from a temperature not higher than reference temperature $Tr_{Low}$ and exceeds reference temperature $Tr_{Low}$ but not higher than reference temperature $Tr_{High}$, control circuit 14 is operable to turn off semiconductor switching element 54 while turning on keeping semiconductor switching element 354. This operation causes control circuit 14 to decrease the full-charge voltage below the low-temperature full-charge voltage ($V_{High}$). Then, if the detected temperature further increases and exceeds reference temperature $Tr_{High}$, control circuit 14 is operable to turn off both semiconductor switching elements 54 and 354. This operation causes control circuit 14 further decreases the full-charge voltage. Thus, control circuit 14 is operable to decrease the full-charge voltage step-by-step by sequentially turning off semiconductor switching elements 54 and 354 of variable resistor units 53A and 300 in accordance with the increase of the temperature detected by temperature detector 34.

What is claimed is:

1. A capacitor device comprising:
a capacitor unit;
a charge circuit for charging the capacitor unit, the charge circuit being configured to be connected to a main power supply;
a temperature detector for detecting a temperature of the capacitor unit or a temperature around the capacitor unit;
a voltage-dividing circuit for outputting a divided voltage obtained by dividing a voltage of the capacitor unit;
a reference voltage circuit for outputting a reference voltage that is a constant voltage;
a comparator circuit comparing the divided voltage with the reference voltage so as to cause the charge circuit to operate such that the voltage of the capacitor unit reaches a full-charge voltage; and
a control circuit for determining the full-charge voltage,
wherein the voltage-dividing circuit including:
a first resistor and a second resistor connected in series to the first resistor at a node; and
a first variable resistor unit connected in parallel to the first resistor, the first variable resistor unit including a third resistor and a first semiconductor switching element connected in series to the third resistor, wherein the voltage-dividing circuit outputs the divided voltage from the node, and
wherein the control circuit is operable to:
determine the full-charge voltage to be a predetermined high-temperature full-charge voltage by turning off the first semiconductor switching element when the detected temperature exceeds a reference temperature; and
determine the full-charge voltage to be a predetermined low-temperature full-charge voltage that is higher than the high-temperature full-charge voltage by turning on the first semiconductor switching element when the detected temperature is not higher than the reference temperature.

2. The capacitor device according to claim 1, further comprising
a discharge circuit for discharging the capacitor unit,
wherein the control circuit is operable to control the discharge circuit to discharge the capacitor unit such that the voltage of the capacitor unit reaches the predetermined high-temperature full-charge voltage when the detected temperature increases from a temperature lower than the reference temperature to a temperature exceeding the reference temperature.

3. The capacitor device according to claim 1, further comprising
a voltage monitor connected to the capacitor unit,
wherein the capacitor unit includes a plurality of capacitors connected to each other,
wherein the voltage monitor detects voltages of the plurality of capacitors, and
wherein the control circuit is operable to:
output an abnormal overvoltage signal if at least one of the detected voltages of the plurality of capacitors exceeds a reference overvoltage;
determine the reference overvoltage to be a predetermined low-temperature reference overvoltage if the voltage of the capacitor unit is higher than the predetermined high-temperature full-charge voltage when the detected temperature increases from a temperature lower than the reference temperature to a temperature exceeding the reference temperature; and determine the reference overvoltage to be a predetermined high-temperature reference overvoltage that is lower than the predetermined low-temperature reference overvoltage if the voltage of the capacitor unit is not higher than the predetermined high-temperature full-charge voltage when the detected temperature increases from a temperature lower than the reference temperature to a temperature exceeding the reference temperature.

4. The capacitor device according to claim 1,
wherein the voltage-dividing circuit further includes a second variable resistor unit connected in series to the first resistor, the second variable resistor unit including a fourth resistor and a second switching element connected in series to the fourth resistor, and
wherein the control circuit is operable to decrease the full-charge voltage step-by-step from the predetermined low-temperature full-charge voltage by sequentially turning off the first semiconductor switching element and the second semiconductor switching element in accordance with an increase of the detected temperature.

5. The capacitor device according to claim 1, wherein, when the detected temperature is lower than the reference temperature, the control circuit is operable to output an output-voltage command signal for increasing a voltage output from the main power supply.

6. A capacitor device comprising:
a capacitor unit;
a charge circuit for charging the capacitor unit, the charge circuit being configured to be connected to a main power supply;
a temperature detector for detecting a temperature of the capacitor unit or a temperature around the capacitor unit;
a reference voltage circuit including a constant-voltage power supply and a voltage-dividing circuit for dividing a voltage of the constant-voltage power supply and outputting a reference voltage that is a constant voltage;
a comparator circuit comparing a voltage proportional to a voltage of the capacitor unit with the reference voltage so as to cause the charge circuit to operate such that the voltage of the capacitor unit reaches a full-charge voltage; and
a control circuit for determining the full-charge voltage,
wherein the voltage-dividing circuit includes:
a first resistor and a second resistor connected in series to the first resistor at a node; and
a first variable resistor unit connected in parallel to the first resistor, the first variable resistor unit including a third resistor and a first semiconductor switching element connected in series to the third resistor, wherein the voltage-dividing circuit outputs the divided voltage from the node and
wherein the control circuit is operable to:
determine the full-charge voltage to be a predetermined high-temperature full-charge voltage by turning off the first semiconductor switching element when the detected temperature exceeds a reference temperature; and
determine the full-charge voltage to be a predetermined low-temperature full-charge voltage that is higher than the predetermined high-temperature full-charge voltage by turning on the first semiconductor switching element when the detected temperature is not higher than the reference temperature.

7. The capacitor device according to claim 6, further comprising
a discharge circuit for discharging the capacitor unit,
wherein the control circuit is operable to control the discharge circuit to discharge the capacitor unit such that the voltage of the capacitor unit reaches the predetermined high-temperature full-charge voltage when the detected temperature increases from a temperature lower than the reference temperature to a temperature exceeding the reference temperature.

8. The capacitor device according to claim 6, further comprising
a voltage monitor connected to the capacitor unit,
wherein the capacitor unit includes a plurality of capacitors connected to each other,
wherein the voltage monitor detects voltages of the plurality of capacitors, and
wherein the control circuit is operable to:
output an abnormal overvoltage signal if at least one of the detected voltages of the plurality of capacitors exceeds a reference overvoltage;
determine the reference overvoltage to be a predetermined low-temperature reference overvoltage if the voltage of the capacitor unit is higher than the predetermined high-temperature full-charge voltage when the detected temperature increases from a temperature lower than the reference temperature to a temperature exceeding the reference temperature; and
determine the reference overvoltage to be a predetermined high-temperature reference overvoltage that is lower than the predetermined low-temperature reference overvoltage if the voltage of the capacitor unit is not higher than the predetermined high-temperature full-charge voltage when the detected temperature increases from a temperature lower than the reference temperature to a temperature exceeding the reference temperature.

9. The capacitor device according to claim 6,
wherein the voltage-dividing circuit further includes a second variable resistor unit connected in parallel to the first resistor, the second variable resistor unit including a fourth resistor and a second switching element connected in series to the fourth resistor,
wherein the control circuit is operable to decrease the full-charge voltage step-by-step from the predetermined low-temperature full-charge voltage by sequentially turning off the first semiconductor switching element and the second semiconductor switching element in accordance with an increase of the detected temperature.

10. The capacitor device according to claim 6, the control circuit operates to output an output-voltage command signal for increasing a voltage output from the main power supply when the detected temperature is lower than the reference temperature.

* * * * *